US012620276B2

(12) United States Patent
Endo et al.

(10) Patent No.: US 12,620,276 B2
(45) Date of Patent: May 5, 2026

(54) DRIVING DIAGNOSIS SYSTEM

(71) Applicant: TOYOTA JIDOSHA KABUSHIKI KAISHA, Toyota (JP)

(72) Inventors: Masato Endo, Nagoya (JP); Motoshi Kojima, Toyota (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/734,145

(22) Filed: Jun. 5, 2024

(65) Prior Publication Data

US 2025/0095418 A1      Mar. 20, 2025

(30) Foreign Application Priority Data

Sep. 19, 2023      (JP) ................................. 2023-150682

(51) Int. Cl.
*G07C 5/06* (2006.01)
*G06F 40/35* (2020.01)

(52) U.S. Cl.
CPC .............. *G07C 5/06* (2013.01); *G06F 40/35* (2020.01)

(58) Field of Classification Search
CPC .................................. G07C 5/06; G06F 40/35
See application file for complete search history.

(56) References Cited

U.S. PATENT DOCUMENTS

| | | | | |
|---|---|---|---|---|
| 8,275,402 B2 * | 9/2012 | Talty | .................... | H04L 12/189 455/518 |
| 8,558,690 B2 * | 10/2013 | Kleve | .................... | G08B 25/00 340/991 |
| 2011/0025500 A1 * | 2/2011 | Piccioni | ................. | G08B 25/08 340/540 |
| 2011/0080282 A1 * | 4/2011 | Kleve | .................... | H04M 11/04 340/539.11 |
| 2015/0116114 A1 * | 4/2015 | Boyles | ................. | G08B 25/00 340/539.17 |
| 2021/0258278 A1 * | 8/2021 | Kaneichi | ................ | H04L 67/12 |

FOREIGN PATENT DOCUMENTS

| | | |
|---|---|---|
| JP | 2015-210547 A | 11/2015 |
| JP | 2023-085100 A | 6/2023 |

* cited by examiner

*Primary Examiner* — Richard M Camby
(74) *Attorney, Agent, or Firm* — SoraIP, Inc.

(57) ABSTRACT

By executing the program, the processor realizes an acquisition unit, a diagnosis unit, and a message application providing unit. The acquisition unit acquires the driving data of the watching target person from the vehicle. The diagnosis unit performs a driving diagnosis based on the driving data. The message application providing unit displays a message input by the watching target person and the watcher on the chat screen. The message application providing unit includes a display control unit and a message generation unit. The display control unit displays a message on the chat screen. After the notification message notifying that the result of the driving diagnosis has been generated is displayed on the chat screen, the message generation unit can generate a reaction message for the result of the driving diagnosis.

4 Claims, 13 Drawing Sheets

OPERATION DIAGNOSIS REPORT

SUNDAY, AUGUST 20, 2023
OPERATION OF 9:50–10:30

SAFETY RANK <u>A</u>

TO BE CHECKED  BLINKER

IT SEEMS THAT THE TIME FROM THE START OF THE BLINKER
AT ● TO THE LANE CHANGE IS SHORT.
MAKE SURE TO CHANGE THE LANE WITH SUFFICIENT TIME.

CURRENT DRIVING ROUTE

< SAFETY DIAGNOSIS BY ITEM >

ACCELERATOR: RANK A

BRAKE: RANK A

HANDLE: RANK A

BLINKER: RANK B

BACK: RANK A

DRIVING DIAGNOSIS SYSTEM

CROSS-REFERENCE TO RELATED APPLICATION

This application claims priority to Japanese Patent Application No. 2023-150682 filed on Sep. 19, 2023, incorporated herein by reference in its entirety.

BACKGROUND

1. Technical Field

The present specification discloses a driving diagnosis system.

2. Description of Related Art

The behavior of a vehicle and a driving operation can be detected by providing a sensor in the vehicle. Details of driving can be evaluated based on detected data (driving data). For example, in Japanese Unexamined Patent Application Publication No. 2023-85100 (JP 2023-85100 A), a bonus is given when the result of driving diagnosis is good. This bonus is given to a person (beneficiary) other than a driver. For example, when the driver is an elderly person, a grandchild of the driver is the beneficiary. That is, when the details of driving of the driver are good, a bonus is given to the grandchild of the driver. By providing such a bonus service, the driver is motivated to improve the quality of the driving operation.

In Japanese Unexamined Patent Application Publication No. 2015-210547 (JP 2015-210547 A), when watching the action of a watching target person such as an elderly person, a camera is used to capture an image of the watching target person. The image of the watching target person is replaced with an avatar image. Thus, the privacy of the watching target person is protected.

SUMMARY

A driving diagnosis obtained when the watching target person drives the vehicle may be sent to a watcher as well as the watching target person. When the monitoring target person and the watcher communicate with each other about the sent driving diagnosis, improvement in the driving operation by the watching target person can be expected.

However, it may be difficult to immediately check the driving diagnosis, for example, because the watcher is at business. Therefore, the present specification discloses a driving diagnosis system capable of achieving more active communication between a watching target person and a watcher.

A driving diagnosis system disclosed herein includes a processor and a storage medium. The storage medium stores a program. The processor is configured to execute the program to implement an acquisition unit, a diagnosis unit, and a message application providing unit. The acquisition unit is configured to acquire driving data of a watching target person from a vehicle. The diagnosis unit is configured to perform driving diagnosis based on the driving data. The message application providing unit is configured to display, on a chat screen, messages input by the watching target person and a watcher. The message application providing unit includes a display control unit and a message generation unit. The display control unit is configured to display messages on the chat screen. The message generation unit is configured to generate a reaction message to a result of the driving diagnosis after a notification message for notification that the result of the driving diagnosis has been generated is displayed on the chat screen.

With the above configuration, the reaction message to the result of the driving diagnosis is input to the chat screen on behalf of the watcher. Thus, the communication about the result of the driving diagnosis is made active.

In the above configuration, the display control unit may be configured to display the reaction message on the chat screen after a predetermined waiting period for waiting for input of a message by the watcher has elapsed from a point in time when the notification message was displayed on the chat screen.

With the above configuration, it is possible to reduce the occurrence of a case where the reaction message generated by the message generation unit is displayed on the chat screen before a reaction message is input by the watcher.

In the above configuration, the message generation unit may be configured to determine whether the reaction message is generable based on a frequency of input of the message by the watcher.

The message generation unit is provided to assist communication of the watcher. In a case where the communication of the watcher is active, the generation of the reaction message is restricted, thereby suppressing interference with the communication between the watching target person and the watcher.

In the above configuration, the message generation unit may be configured to transmit a safety check message after a predetermined observation period has elapsed from a point in time when a latest message was input by the watching target person.

In the above configuration, when the motion of the watching target person is unknown from the message application, the safety check message is displayed to prompt the watching target person to make a response.

In the above configuration, the result of the driving diagnosis may include an evaluation of a cognitive function of the watching target person. In this case, the observation period may be determined based on the evaluation of the cognitive function.

With the above configuration, for example, when an evaluation that the cognitive function has deteriorated is obtained, it is possible to check safety based on the cognitive function of the watching target person by shortening the observation period.

With the driving diagnosis system disclosed herein, it is possible to achieve more active communication between the watching target person and the watcher.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration

Figure 1:
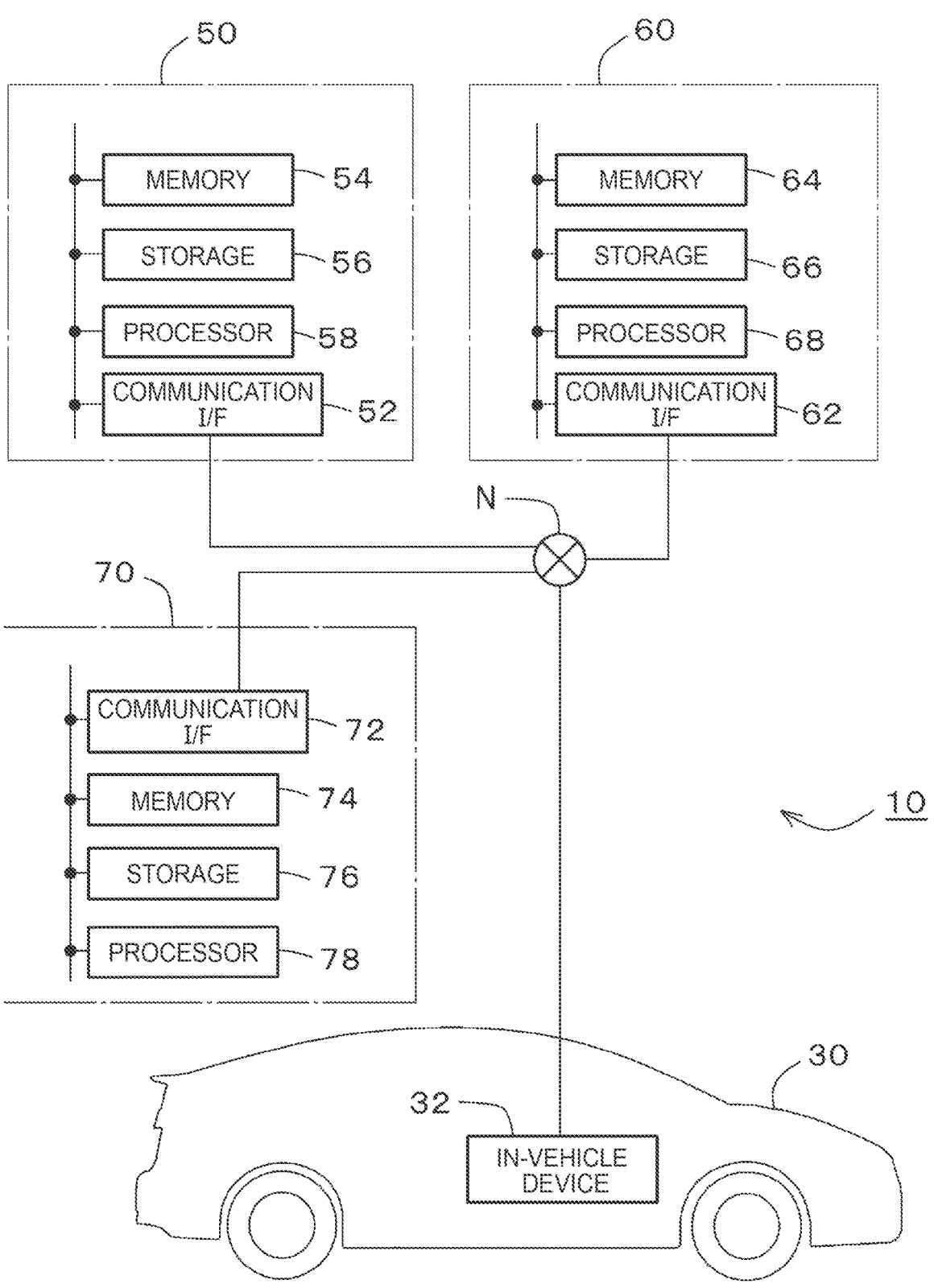
FIG. 1 is a diagram illustrating a configuration of a driving diagnosis system.

Hereinafter, the configuration of the driving diagnosis system 10 will be described with reference to the drawings. FIG. 1 illustrates an overall configuration of the driving diagnosis system 10.

The driving diagnosis system 10 detects a behavior of the vehicle 30 and a driving operation. Based on the detected data (driving data), the driving diagnosis system 10 diagnoses a change in the driver's ability and the propriety of the vehicle driving. The result of the driving diagnosis is sent to the driver. Further, when the driver is the watching target person, the driving diagnosis system 10 also sends the diagnosis result to the watcher.

Incidentally, the watching target person includes an elderly person, a beginner of driving, an occupational driver, and the like. And, family of the elderly, family of the driving beginner, employer of the driver are included as the watcher.

Figure 6:
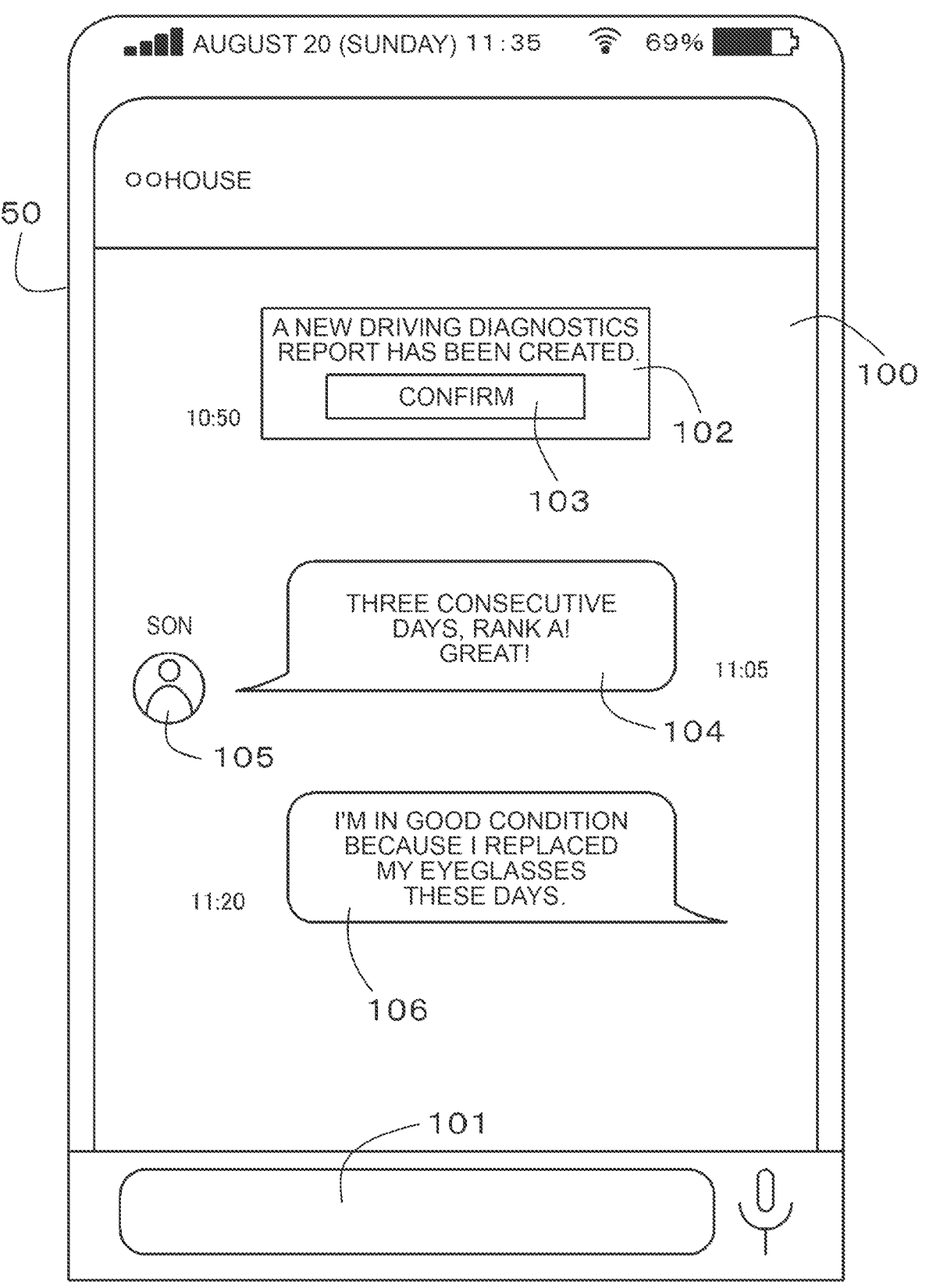
FIG. 6 is a diagram illustrating a chat screen displayed on a mobile terminal when direct communication is performed.

Further, the driving diagnosis system 10 provides a message application to the watcher and the watching target person. FIG. 6 illustrates a chat screen 100. The chat screen 100 is displayed by activating a message application. On the chat screen 100, a message 104 input by the watcher and a message 106 input by the watching target person are displayed.

Figure 8:
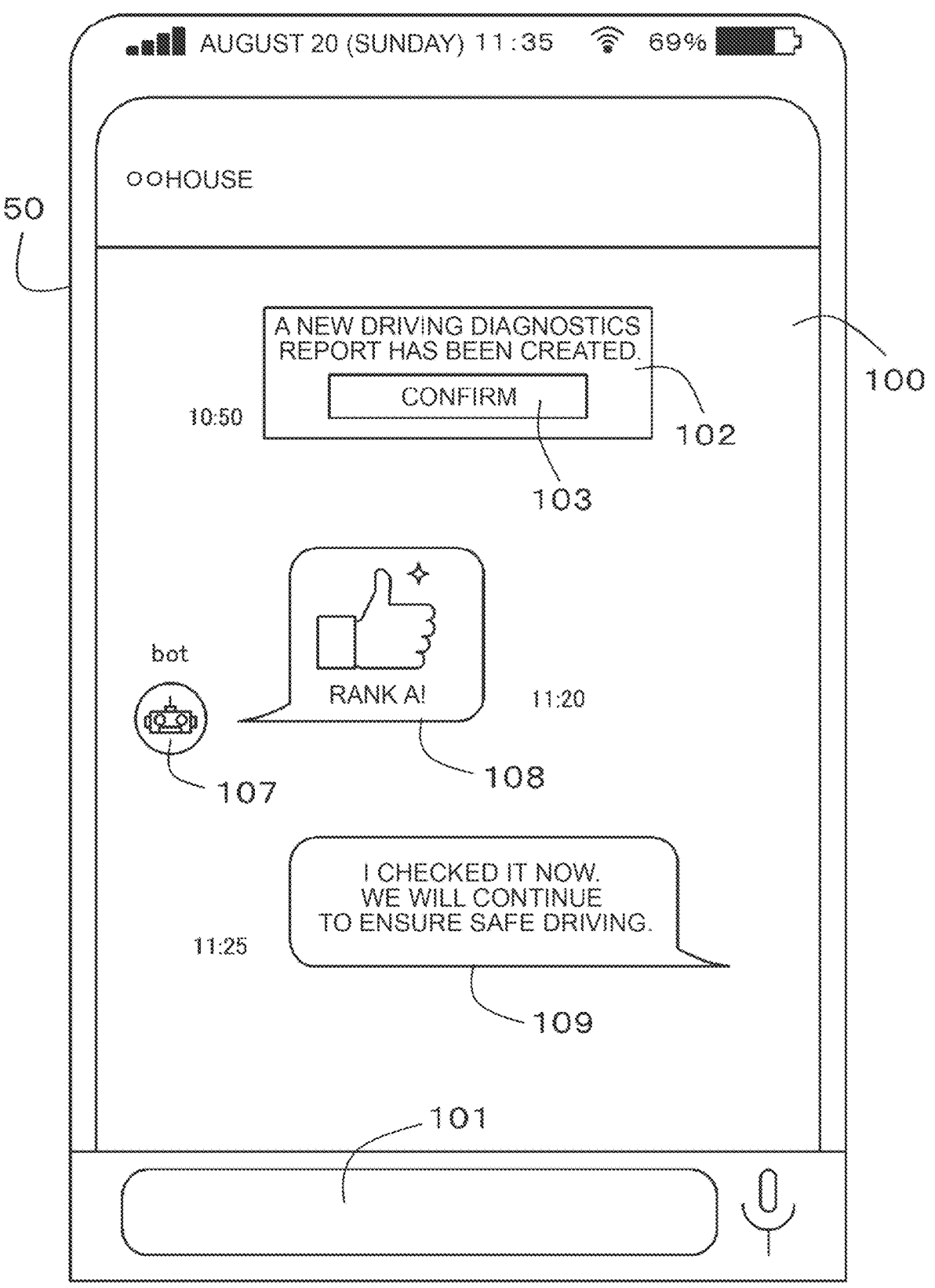
FIG. 8 is a diagram illustrating a chat screen displayed on a mobile terminal when alternative communication is being performed.

In addition, in this message application, as illustrated in FIG. 8, a message 108 by a so-called chatbot is displayed on the chat screen 100 in addition to the watcher and the watching target person. Messages are exchanged for the driving diagnosis of the watching target person by three persons: the watching target person, the watcher, and the chatbot. Such communication through the message application causes motivation to improve the quality of the driving operation to the watching target person. Details of the message application will be described later.

Referring to FIG. 1, the driving diagnosis system 10 includes a vehicle 30, a watching target person terminal 50, a watcher terminal 60, and a center server 70. The vehicle 30, the watching target person terminal 50, the watcher terminal 60, and the center server 70 can transmit and receive data via the network N. The network N is, for example, the Internet or a dedicated communication line. The network N is a wireless communication network.
Vehicle The vehicle 30 is a vehicle driven by a watcher. The in-vehicle device 32 is mounted on the vehicle 30. The in-vehicle device 32 detects and collects the operation content of the driver and the behavior of the vehicle 30. The in-vehicle device 32 transmits the collected data (operation data) to the center server 70 via the network N. As will be described later, based on the received driving data, the center server 70 evaluates the driving operation of the watcher.

Figure 2:
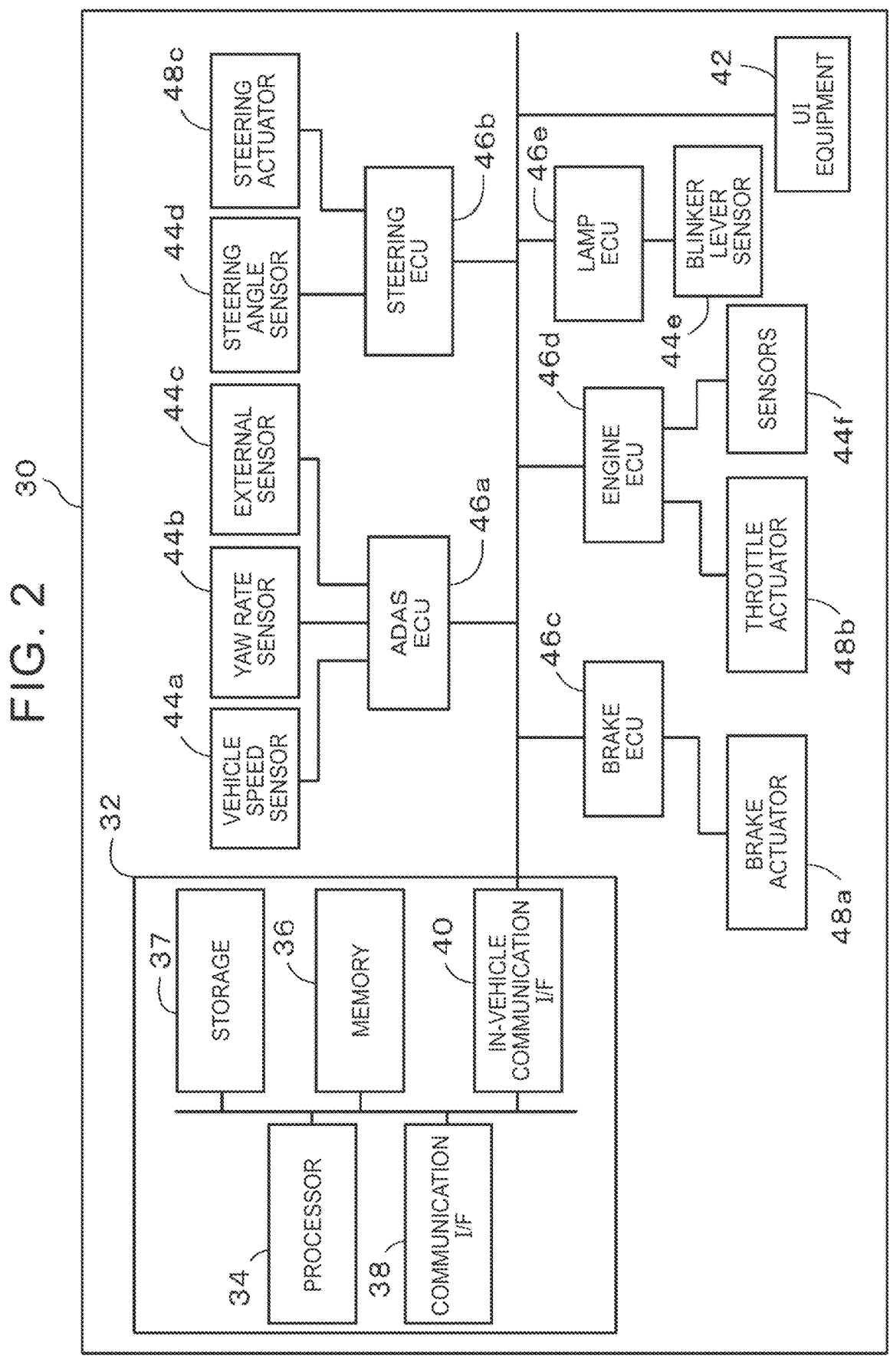
FIG. 2 is a diagram illustrating a configuration of a vehicle.

FIG. 2 illustrates a detailed configuration of the vehicle 30. The in-vehicle device 32 is a computer. The in-vehicle device 32 includes a processor 34, a memory 36, a storage device 37, a communication I/F 38, and an in-vehicle communication I/F 40.

The storage device 37 is, for example, a storage medium that stores data for a long period of time as compared with the memory 36. The storage device 37 is composed of, for example, an HDD or an SSD. The storage device 37 stores programs for computationally processing data sent from various ECU (described later) of the vehicle 30. Operation data is generated by the processor 34 executing the program.

A plurality of actuators 48 are mounted on the vehicle 30. The plurality of actuators 48 operate in response to an instruction from a driver (that is, a watching target person). The plurality of actuators 48 includes, for example, a brake actuator 48a, a throttle actuator 48b, and a steering actuator 48c.

In addition, a plurality of sensors 44 are mounted on the vehicle 30. The plurality of sensors 44 detect the state of the vehicle 30. The plurality of sensors 44 includes, for example, a vehicle speed sensor 44a, a yaw rate sensor 44b, an external sensor 44c, a steering angle sensor 44d, a blinker lever sensor 44e, and engine-related sensors 44f.

Note that the external sensor 44c is a sensor group used for detecting the surroundings of the vehicle 30. The external sensor 44c includes, for example, a camera, a millimeter-wave radar, a LiDAR, and a GPS. The camera images the surroundings of the vehicle 30. The millimeter wave radar is a distance measuring means that transmits a probe wave and receives a reflected wave. LiDAR scans the surroundings of the vehicle 30. GPS detects the position of the vehicle 30.

The sensors 44f include an oil temperature sensor, a hydraulic pressure sensor, and a rotational sensor. The oil temperature sensor measures the oil temperature of the engine oil. The hydraulic pressure sensor measures the hydraulic pressure of the engine oil. The rotation sensor detects a rotation speed of the engine.

The vehicle 30 is further equipped with a plurality of Electronic Control Units (ECUs) 46. The plurality of ECU 46 includes, for example, an ADAS-ECU 46a, a steering ECU 46b, a braking ECU 46c, an engine ECU 46d, and a ramp ECU 46e.

At least one of an associated actuator 48 and a sensor 44 is connected to the respective ECU 46. ECU 46 controls the operation of the connected actuator 48 based on instructions from the processor 34. ECU 46 transmits the data detected by the sensor 44 to the in-vehicle device 32 based on an instruction from the processor 34.

Note that the configuration of the vehicle 30 described above is an example, and may be changed as appropriate. For example, the vehicle 30 may be electrified vehicle using a motor as a power source. The vehicle 30 includes a motor ECU, a motor sensor, a battery ECU, and a battery sensor. The motor ECU controls the operation of the motor. The motor sensor detects an operating state of the motor. The battery ECU controls the operation of the battery. The battery sensor detects a charge/discharge state of the battery.

In addition, the vehicle 30 may have an advanced driving support function or an automatic driving function that the vehicle 30 automatically executes part or all of the acceleration/deceleration control and the steering control.

Watching Target Person Terminal

Referring to FIG. 1, the watching target person terminal 50 is a communication terminal device held by the watching target person. The watching target person terminal 50 is, for example, a smartphone. The watching target person terminal 50 physically includes a communication interface 52, a memory 54, a storage device 56, and a processor 58.

The processor 58 is an arithmetic processor such as a CPU. The storage device 56 is, for example, a storage medium that stores data for a long period of time compared to the memory 54. The storage device 56 is composed of, for example, an HDD or an SSD.

Figure 3:
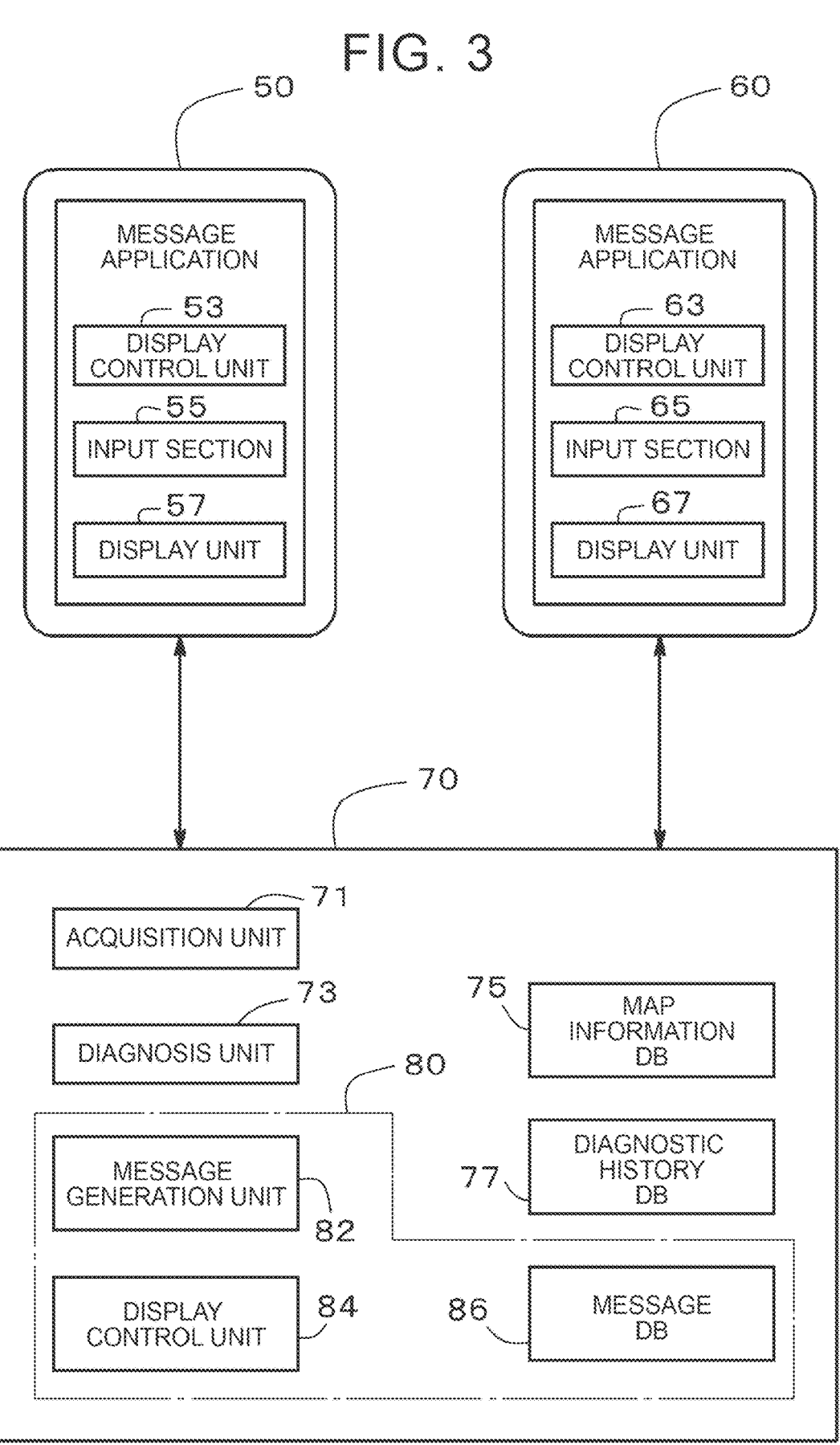
FIG. 3 is a diagram illustrating functional blocks of a mobile terminal and a center server.

The storage device 56 stores a message application program. The message application program is provided from the center server 70. When the processor 58 executes the message application program, the message application function unit illustrated in FIG. 3 is realized in the watching target person terminal 50. The functional unit includes a display control unit 53, an input unit 55, and a display unit 57.

Watcher Terminal

Referring to FIG. 1, the watcher terminal 60 is a communication terminal device held by the watcher. For example, similarly to the watching target person terminal 50, the watcher terminal 60 is a smartphone. That is, when the number of tens of codes is replaced with 5 to 6, the above description of the watching target person terminal 50 is the description of the watcher terminal 60.

Center Server

The center server 70 is, for example, a computer. The center server 70 provides data and services in response to a request from an electronic terminal such as the in-vehicle device 32, the watching target person terminal 50, and the watcher terminal 60. The center server 70 is installed in, for example, a company that manufactures the vehicle 30.

The center server 70 physically includes a communication interface 72, a memory 74, a storage device 76, and a processor 78. In FIG. 1, the center server 70 is illustrated as a single computer. However, the center server 70 may be composed of a plurality of computers installed physically apart. In addition, at least one of the watching target person terminal 50, the watcher terminal 60, and the computer mounted on the vehicle 30 may be responsible for a part of the functions of the center server 70 described later.

The processor 78 is an arithmetic processor such as a CPU. The storage device 76 is, for example, a storage medium that stores data for a long period of time compared to the memory 74. The storage device 76 is composed of, for example, an HDD or an SSD. The storage device 76 stores a program related to driving diagnosis. When the processor 78 executes the program, the functional blocks illustrated in FIG. 3 are realized in the center server 70.

That is, the center server 70 includes an acquisition unit 71, a diagnosis unit 73, a map information database 75, a diagnosis history database 77, and a message application providing unit 80. The acquisition unit 71 receives the driving data of the watching target person from the in-vehicle device 32 via the network N (see FIG. 1). The map information database 75 stores map information as illustrated in the map image 90 of FIG. 4. The diagnosis history database 77 stores the driving history and the driving diagnosis history of the watching target person.

The diagnosis unit 73 performs the driving diagnosis based on the driving data of the watching target person. For example, referring to FIG. 4, the operation is divided into the items of accelerator operation, brake operation, handle operation, blinker operation, and backward operation, and the operation diagnosis is performed.

For example, for an accelerator operation, the presence or absence of rapid acceleration is diagnosed. The presence or absence of a sudden deceleration is diagnosed for the brake operation. With respect to the handle operation, the presence or absence of a so-called steep handle is diagnosed. For the turn-in-car operation, the time taken to change the lane after the turn-in-car lever is activated becomes a diagnosis target. Further, regarding the backward operation, the number of repetitions of forward movement and backward movement (so-called number of turns) is a diagnosis target.

For each of these diagnosis items, the diagnosis unit 73 performs a diagnosis process. In the diagnosis process, the predetermined reference value is compared with the operation data. Based on the diagnosis process, the diagnosis unit 73 determines the rank of each item. A safety rank (see FIG. 4) that is a total rank is obtained from the rank by item.

Further, the diagnosis unit 73 generates an advice statement for a rank having a relatively low evaluation among the item-specific ranks. For example, the diagnosis history database 77 stores advice scores for each item. The diagnosis unit 73 extracts advice scores corresponding to ranks with relatively low evaluations from the diagnosis history database 77.

Figure 4:
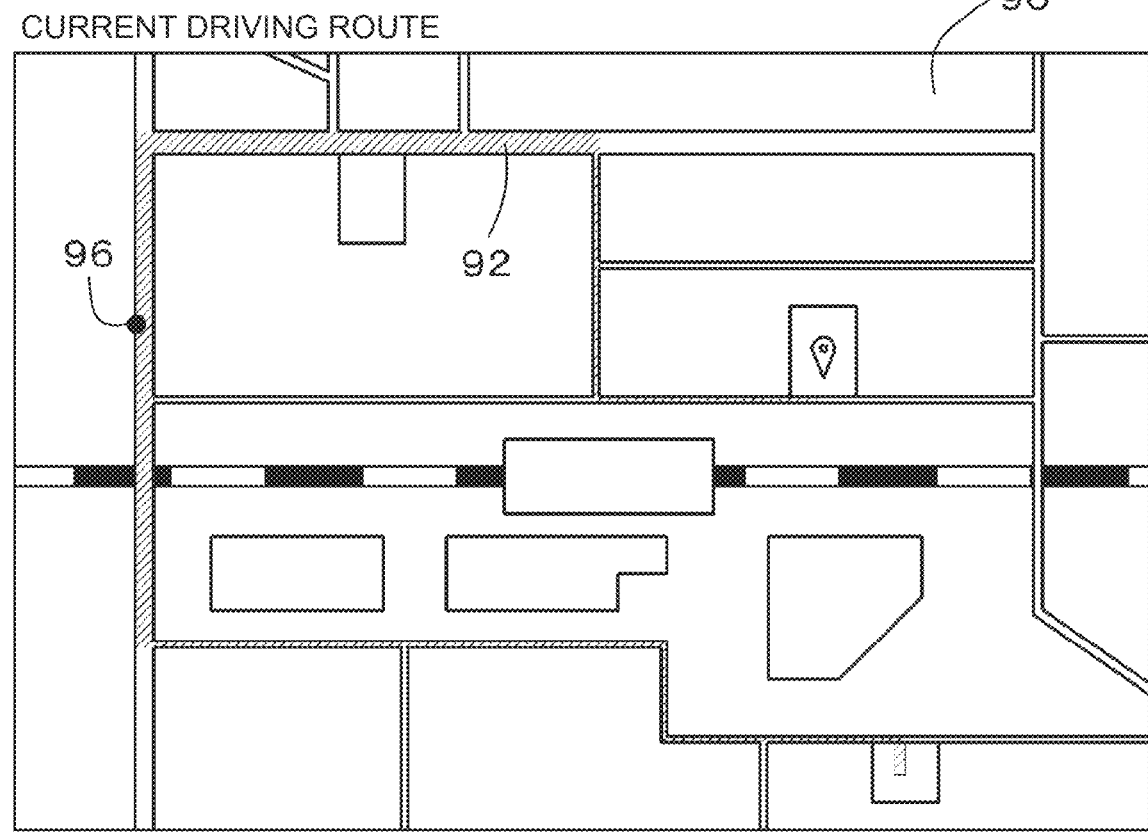
FIG. 4 is a diagram illustrating a driving diagnosis report.

In addition, the diagnosis unit 73 creates the travel route images based on GPS data included in the driving data and the map-information database. The created image is illustrated in FIG. 4 as a map image 90. An image of the caution mark 96 may be superimposed on the travel route 92. For a predetermined item, a caution mark 96 is attached to a point that serves as a basis for the lower evaluation.

Message Application

Referring to FIG. 3, the center server 70 includes a message application providing unit 80. The message application providing unit 80 includes a message generation unit 82, a display control unit 84, and a message database 86.

The message application providing unit 80 provides the message application program to the watching target person terminal 50 and the watcher terminal 60. FIG. 6 illustrates an example of a screen when the watching target person terminal 50 executes a message application.

The message application is a program that displays a message of the user and the opponent on a balloon and performs communication in a chat format. A chat screen 100 and a text box 101 are displayed on the watching target person terminal 50 when the message application is executed. On the chat screen 100, a message 106 (self-message) by the watching target person, a message 104 (other person message) by the watcher, and a message 102 (notification message) by the message application providing unit 80 are displayed. Further, the chat screen 100 displays the icon 105 of the caller of the other party message 104. In addition, the posting time is displayed in each message.

In the chat screen 100, a topic about driving diagnosis is developed. As will be described later, the watcher views the driving diagnosis report (see FIG. 4) of the watching target person, and inputs a message (reaction message) about the report to the message application. As a result of communication about the driving result, the watching target person is motivated to improve the driving operation.

The display control unit 84 displays a notification message 102 on the chat screen 100 as a notification indicating that the driving diagnosis report (see FIG. 4) has been created. In other words, the notification message 102 announces that the result of the driving diagnosis has been generated. Further, in the notification message 102, a link button image 103 for accessing the page of the driving diagnosis report is displayed.

Referring still to FIGS. 3 and 8, the message generation unit 82 can generate the reaction message 108. The reaction message 108 is automatically generated in response to the generation of the driving diagnosis report. That is, the contents of the reaction message 108 change according to the contents of the driving diagnosis report.

The message generation unit 82 is a so-called chatbot, and includes, for example, an image generation AI and a sentence generation AI. The image generation AI is composed of, for example, a convolutional neural network (CNN). The sentence generation AI includes, for example, a recursive neural network (RNN).

For example, the safety rank and the rank of the respective items are inputted to the image generation AI. An image displayed in the reaction message 108 is generated in the output layer of the image generation AI. In addition, the safety rank and the rank of the respective items are also inputted to the sentence generation AI. The text displayed in the reaction message 108 is generated in the output layer of the sentence generation AI.

Alternatively, instead of implementing the generation system AI in the message generation unit 82, a program using a look-up table having a smaller computation load may be implemented. For example, a look-up table in which an image corresponding to the safety rank and a fixed phrase are stored is stored in the message database 86. The message generation unit 82 refers to the safety rank of the driving diagnosis report (see FIG. 4) and extracts an image and a fixed phrase corresponding thereto. The extracted image and the fixed phrase are displayed as a reaction message 108 on the chat screen 100.

Figure 7:
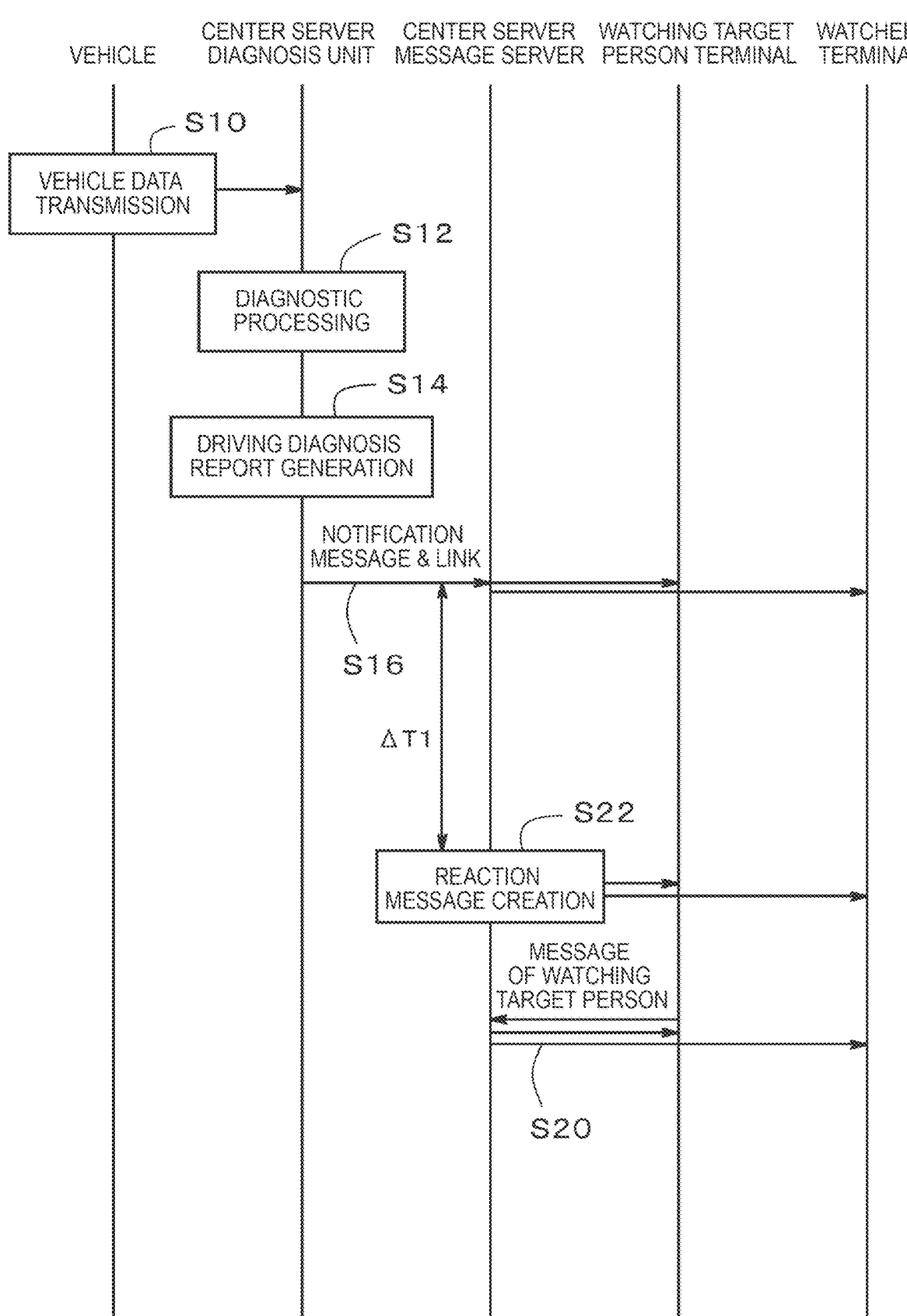
FIG. 7 is a diagram illustrating a process from after operation to communication using a message application (alternative communication by a message generation unit)

The reaction message 108 is generated by triggering a notification message (see S16, S22 of FIG. 7). However, the message generation unit 82 determines whether or not the reaction message 108 can be generated according to the posting frequency of the watcher. Details of this determination will be described later.

Figure 12:
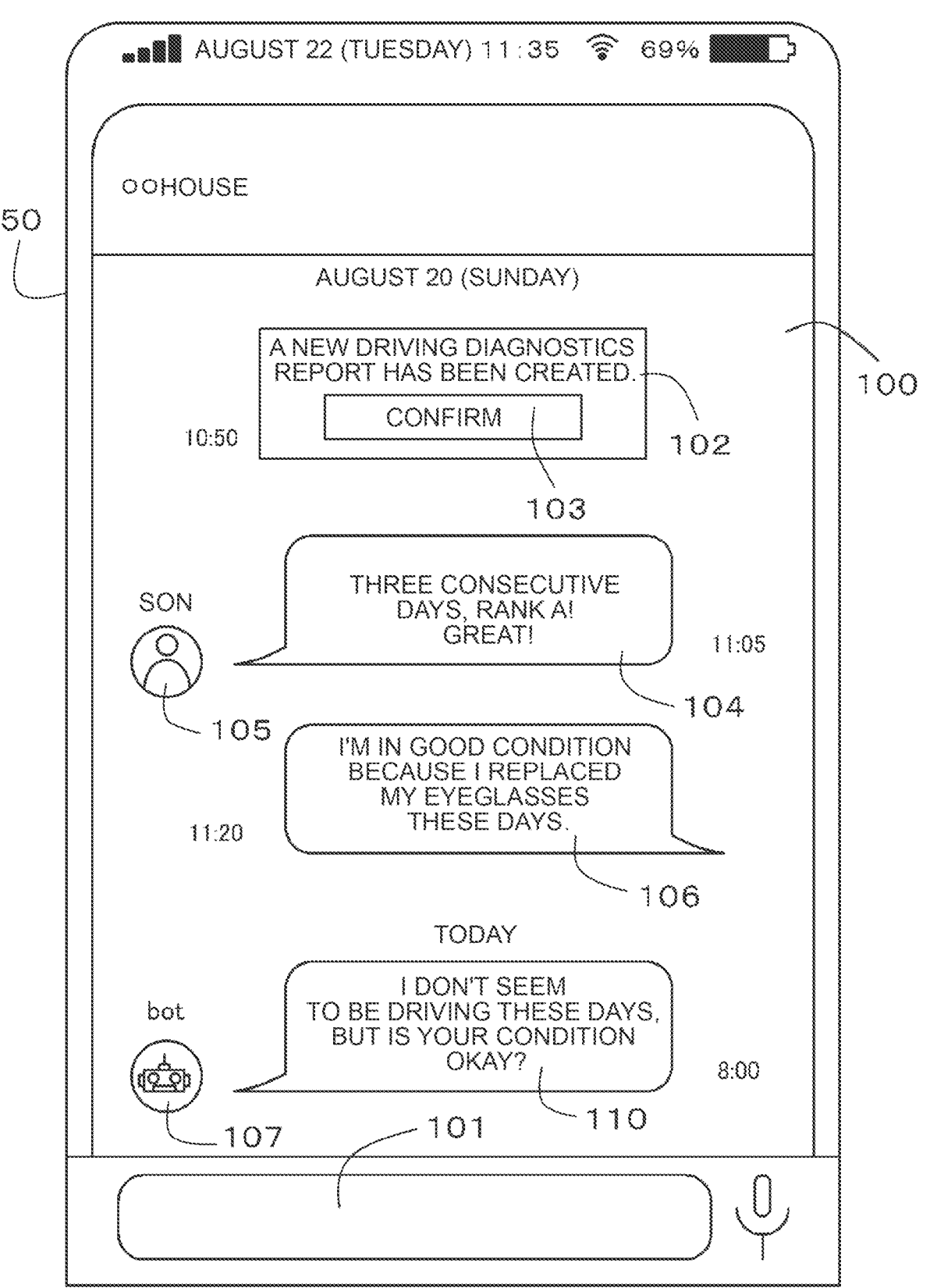
FIG. 12 is a diagram illustrating a chat screen displayed on the mobile terminal when the safety confirmation process is executed.

Further, referring to FIG. 12, in a case where there is no posting by the watching target person for a long period of time, the message generation unit 82 generates the safety confirmation message 110. Details of the process of generating the safety confirmation message will be described later.

The display control unit 84 receives message data from the watching target person terminal 50, the watcher terminal 60, and the message generation unit 82. Then, the display control unit 84 transmits a message to the watching target person terminal 50 and the watcher terminal 60 to display the message.

The display control unit 84 sets the posting timing of the safety confirmation message 110 (see FIG. 12). The posting timing is set according to the cognitive function of the watching target person. For example, when it is determined that the cognitive function of the watching target person is deteriorated, the display control unit 84 posts the safety confirmation message 110 relatively early. The details of the setting of the posting timing will be described later.

Processing from After Operation to Communication by Message Application

Figure 5:
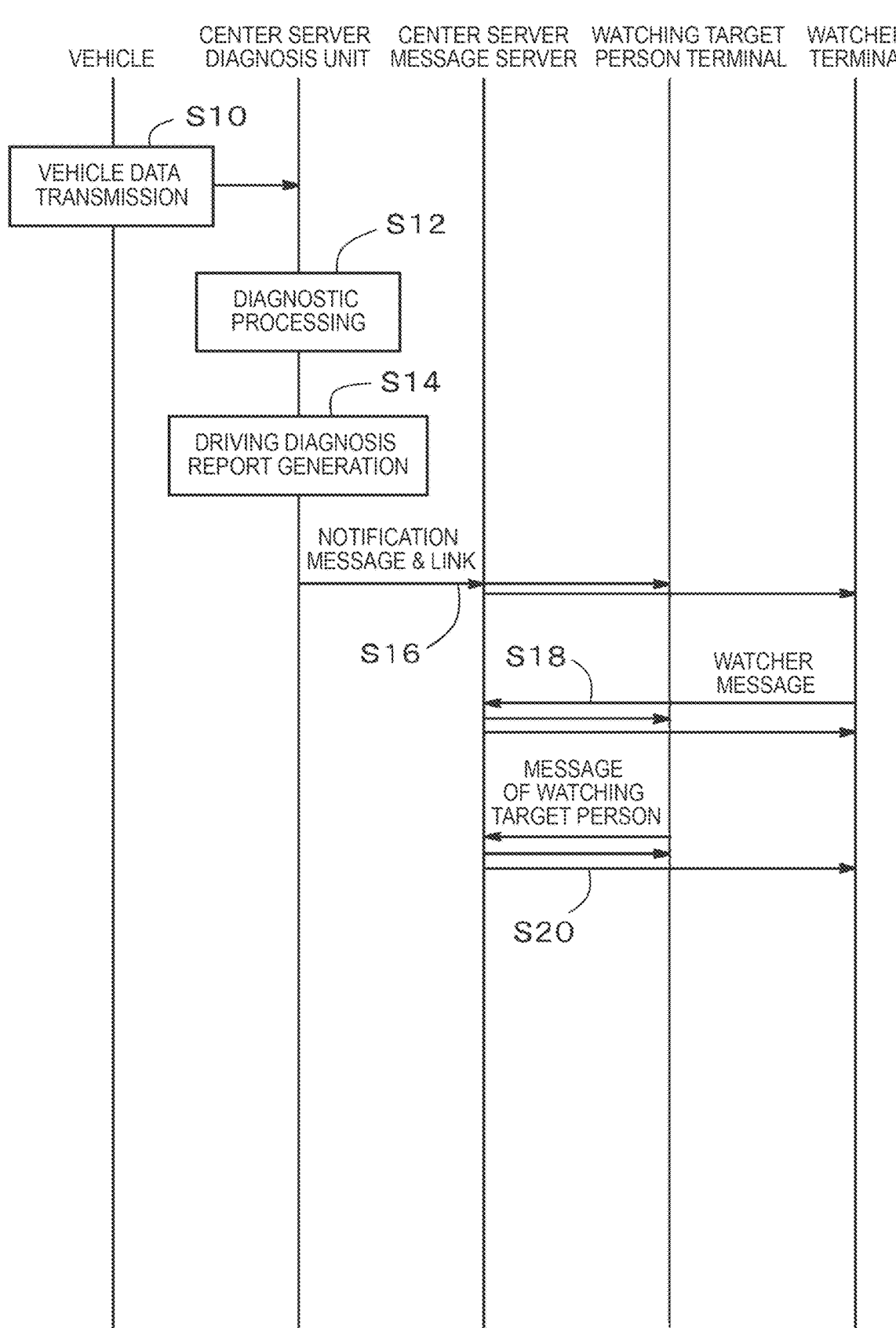
FIG. 5 is a diagram illustrating a process from after operation to communication using a message application (direct communication by a watcher)

FIG. 5 illustrates a data processing process after the vehicle 30 is driven by the watching target person. After the driving, the driving data is transmitted from the in-vehicle device 32 of the vehicle 30 to the acquisition unit 71 of the center server 70 (S10).

The diagnosis unit 73 performs a driving diagnosis based on the driving data (S12). Then, the diagnosis unit 73 generates the driving diagnosis report illustrated in FIG. 4 (S14). For example, the diagnosis unit 73 stores the data of the driving diagnosis report in the message database 86.

The diagnosis unit 73 notifies the display control unit 84 that the driving diagnosis report has been generated (S16). In response to this, the display control unit 84 transmits a notification message to the message application program of the watching target person terminal 50 and the watcher terminal 60. For example, the notification message is a message notifying that the result of the driving diagnosis has been generated, and is not the content of the driving diagnosis report itself.

Referring to FIG. 6, when the message application is activated, a chat screen 100 is displayed on the display units of the watching target person terminal 50 and the watcher terminal 60. The display control unit 63 of each terminal displays a notification message 102 on the chat screen 100. The link button image 103 is superimposed on the notification message 102. By turning on the link image button, the driving diagnosis report (see FIG. 4) stored in the message database 86 can be viewed.

The watcher who views the driving diagnosis report inputs a message to the watcher terminal 60 (S18). This message is also referred to as a reaction message 104 (see FIG. 6) because the impression of the driving diagnosis report is included. The reaction message 104 is once transmitted to the message application providing unit 80. Then, the reaction message 104 is transmitted from the message application providing unit 80 to the watching target person terminal 50 and the watcher terminal 60.

The display control unit 53 of the watching target person terminal 50 displays the reaction message 104 on the chat screen 100. The watching target person reads the reaction message 104 and enters the message 106 as a reply (S20).

In this way, the driving content of the watching target person is shared with the watcher. In addition, communication about the operation contents can be attempted. Such communication motivates the watching target person to improve the driving operation.

Proxy Response by Message Generation Unit

FIG. 7 shows an example of communication using the alternative message by the message generation unit 82. Processes from S10 to S16 are the same as those in FIG. 5, and thus the explanation thereof is omitted.

Figure 9:
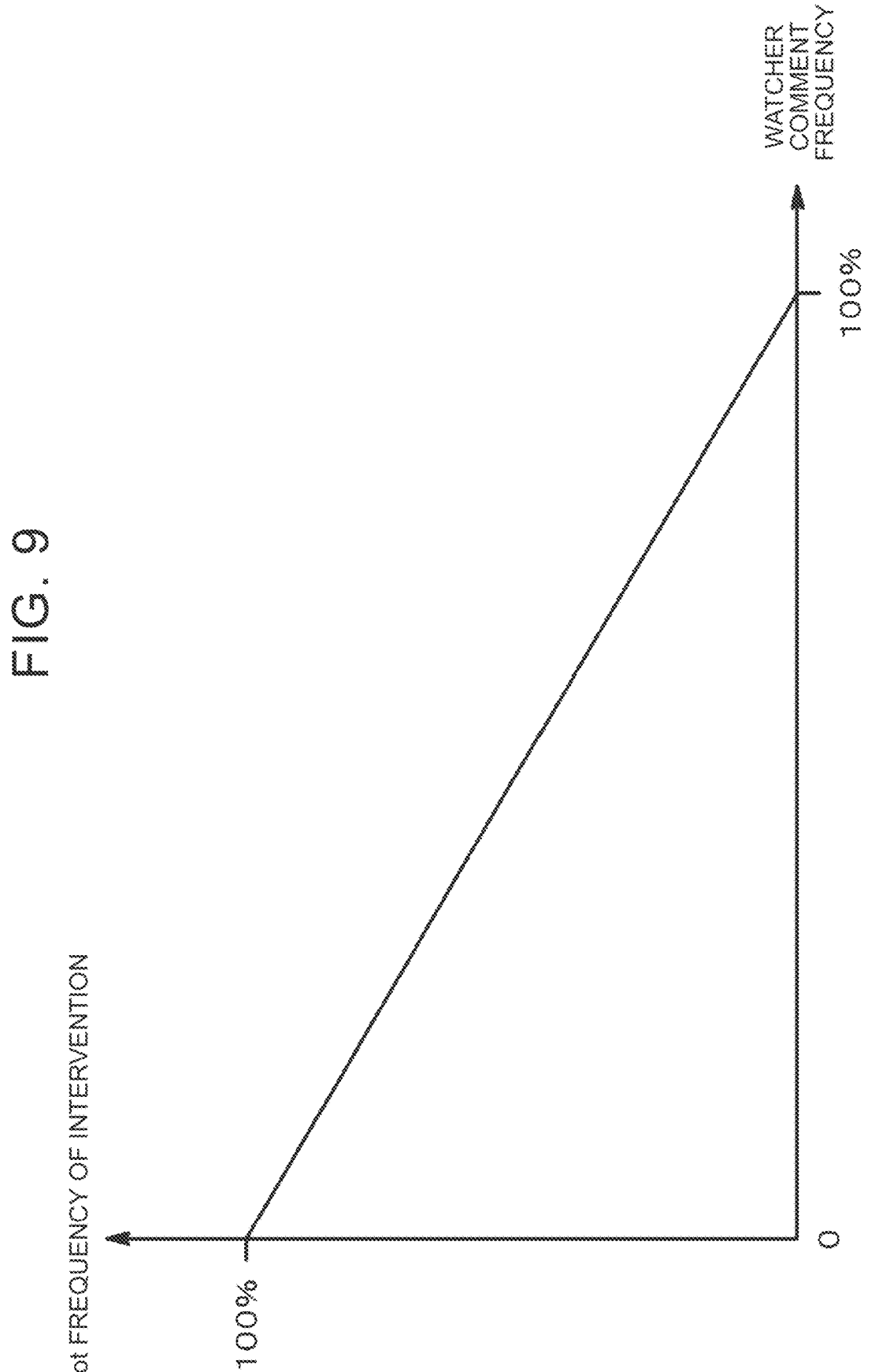
FIG. 9 is a diagram illustrating an intervention frequency of communication by a message generation unit.

Referring to FIGS. 7 and 8, when the notification message 102 is displayed on the chat screen 100 (S16), the message generation unit 82 determines whether or not the reaction message 108 that is an alternative message can be generated. In determining whether or not generation is possible, the message generation unit 82 refers to the message frequency map illustrated in FIG. 9. The message frequency map is stored in the message database 86.

The alternative message generated by the message generation unit 82 is generated for the purpose of assisting communication by the watcher. Therefore, when the watcher frequently inputs a message on the chat screen, generation of an alternative message is unnecessary.

For example, the message generation unit 82 calculates the message input frequency of the watcher with respect to the notification message. Then, the message generation unit 82 refers to the message frequency map and obtains the input frequency (generation frequency or bot interventional frequency) of the reaction message 108 in accordance with the message input frequency of the watcher. The higher the input frequency of the watcher, the lower the input frequency of the alternative message by the message generation unit.

For example, the message generation unit 82 counts the number of times of input (the number of times of posting) of the notification message 102. If the input frequency of the alternative message is 25%, when the notification message 102 is input four times, the message generation unit 82 generates the reaction message 108 as the alternative message.

When the message generation unit 82 generates the reaction message 108 in response to the display of the notification message 102, the display control unit 84 measures the time from the time when the notification message 102 is displayed on the chat screen 100. When the measured time has passed the predetermined standby time ΔT1, the display control unit 84 acquires the reaction message 108 from the message generation unit 82. The obtained reaction message 108 is transmitted to the message application of the watching target person terminal 50 and the watcher terminal 60.

The waiting time ΔT1 is set to suppress the reaction message 108 from being displayed before the watcher posts the message. The waiting time ΔT1 is a time for waiting for the message input of the watcher. In other words, the standby time ΔT1 is set in order to suppress the immediate response by the message generation unit 82. For example, the waiting time ΔT1 is set within 5 minutes or more and 15 minutes or less.

For example, when the watcher posts a message during the waiting time ΔT1, the display control unit 84 does not transmit the reaction message 108 to the watching target person terminal 50 and the watcher terminal 60.

Figure 10:
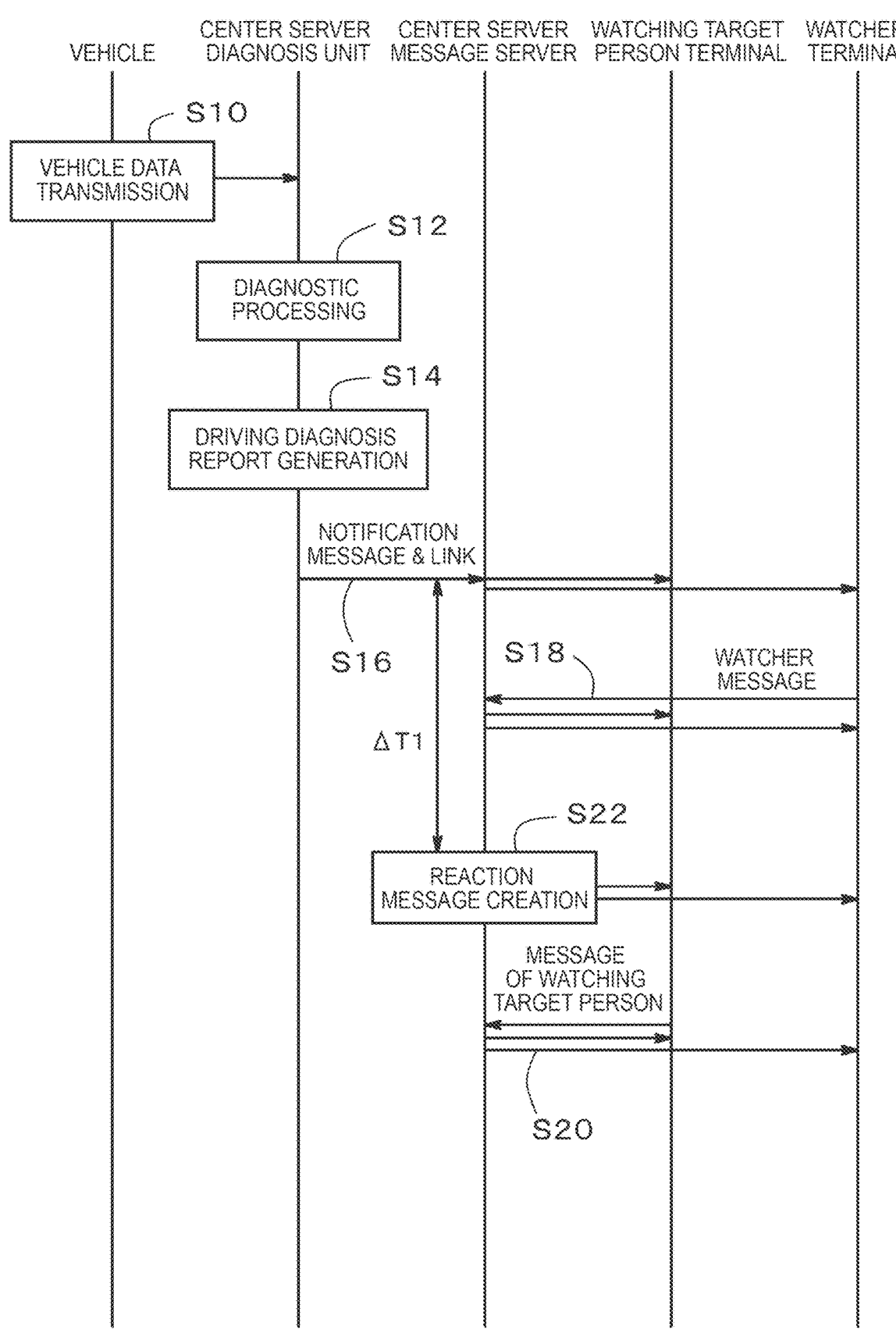
FIG. 10 is a diagram illustrating mixed communication in which direct communication and alternative communication are mixed.

Alternatively, as illustrated in FIG. 10, the reaction message 108 generated by the message generation unit 82 may be posted regardless of whether the watcher posts the reaction message 104. When a plurality of reaction messages is displayed on the chat screen 100 for the driving diagnosis, the watching target person is motivated to improve the driving operation.

Confirmation of Safety of Watching Target Persons

Figure 11:
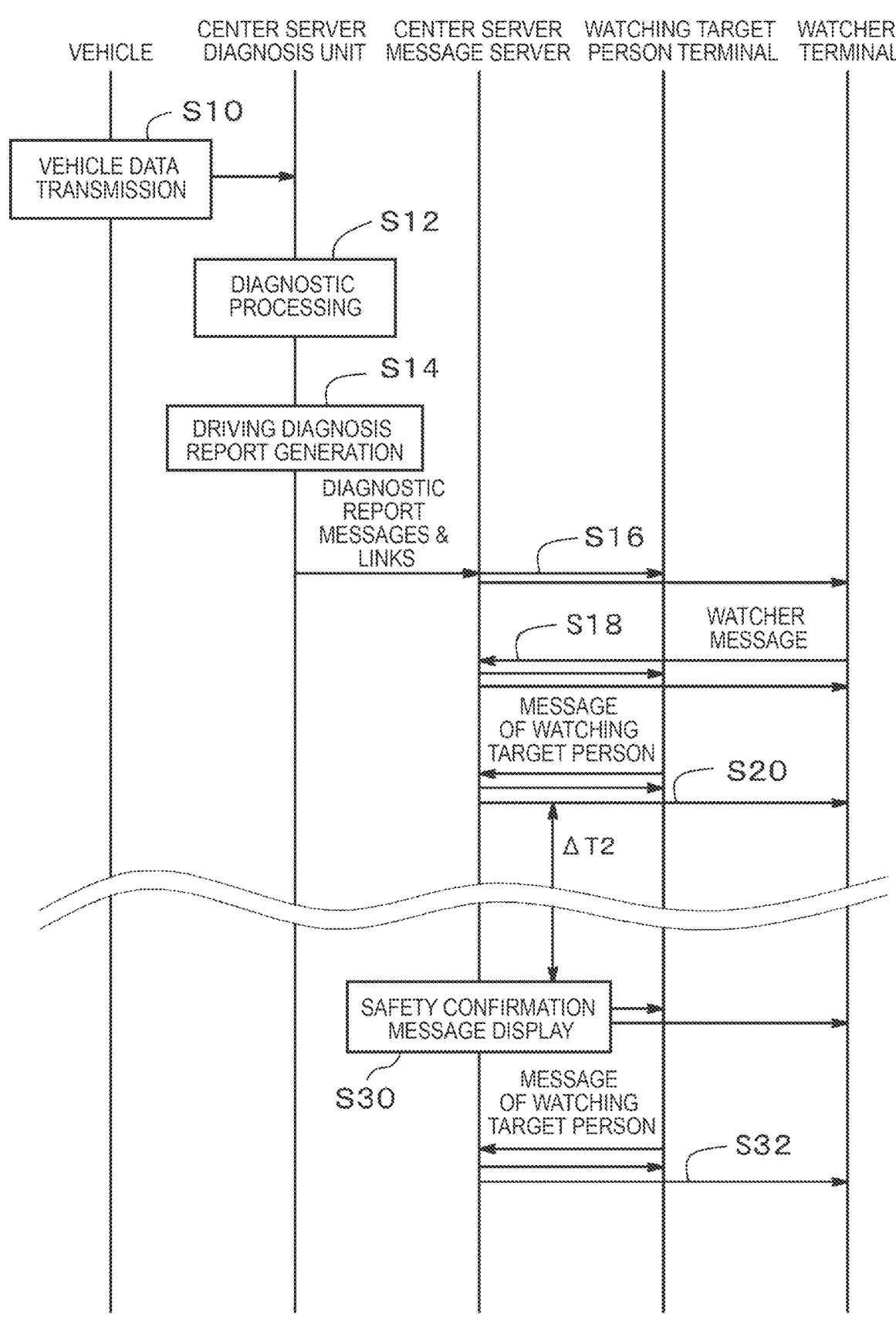
FIG. 11 is a diagram illustrating a safety confirmation process.

The message application can be used to confirm the safety of the watching target person. FIG. 11 exemplifies a situation in which no message is posted from the watching target person over a long period of time after the message posting (S20) of the latest watching target person.

The display control unit 84 measures time from the latest message input time point (message posting time point) of the watching target person. When the measurement time has passed the predetermined observation time ΔT2, the display control unit 84 causes the message generation unit 82 to generate a safety confirmation message 110 (see FIG. 12). The generated safety confirmation message 110 is transmitted from the display control unit 84 to the message application of the watching target person terminal 50 and the watcher terminal 60.

When the safety confirmation message 110 is displayed on the chat screen 100, a reaction of the watching target person can be expected. In addition, the safety confirmation message 110 serves as a trigger for the watcher to contact the watching target person.

Figure 13:
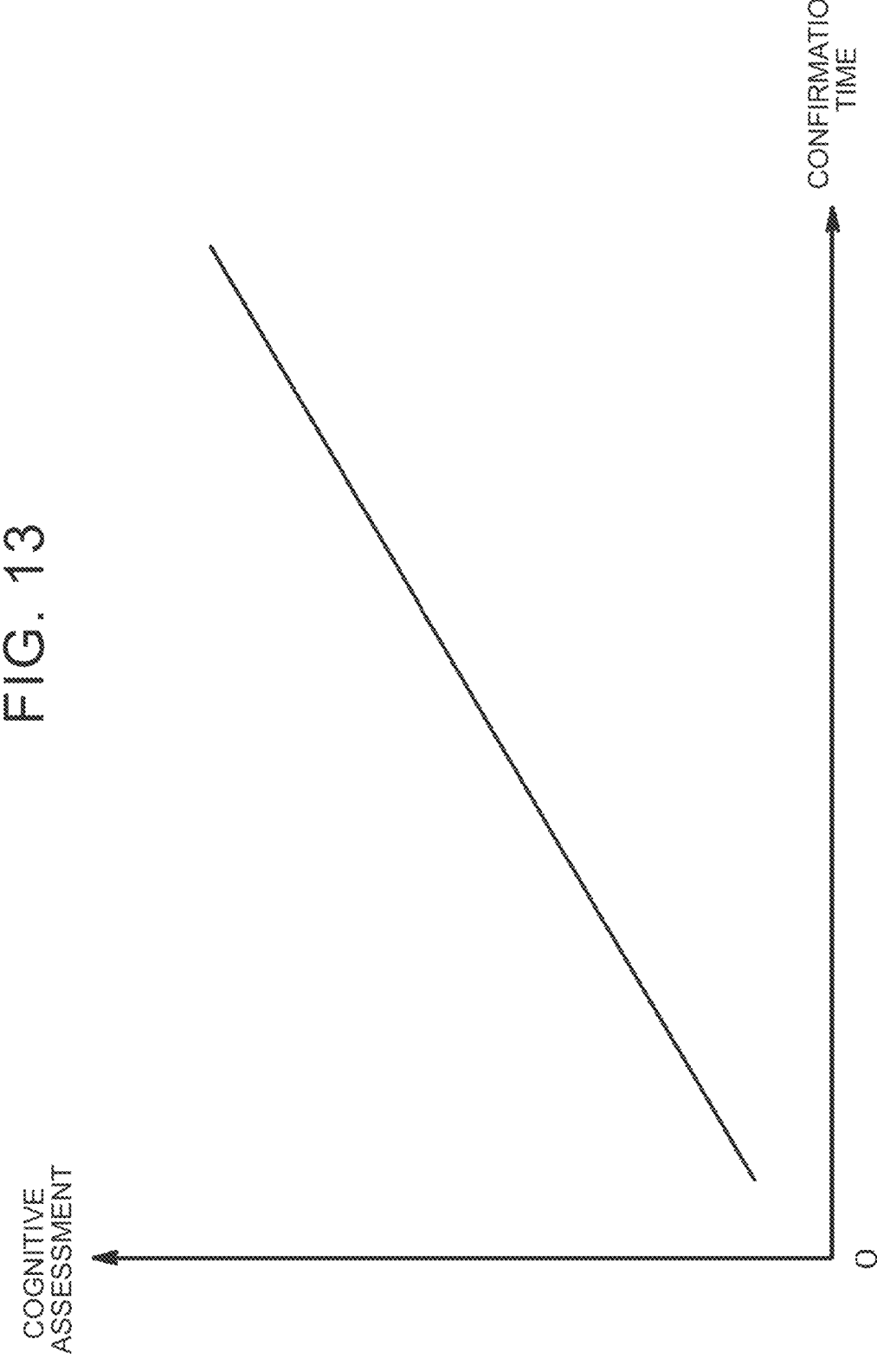
FIG. 13 is a diagram for explaining an observation time as a trigger for inputting a safety confirmation message.

The observation time ΔT2 is set based on the cognitive function map of FIG. 13. The cognitive function map is stored in the message database 86. In the cognitive function map, for example, a confirmation time is defined on the horizontal axis and a cognitive ability evaluation value of the watching target person is defined on the vertical axis.

In the driving diagnosis report (see FIG. 4), items related to the cognitive function of the watching target person are provided. For example, when the number of times of switching of the back is large, it is estimated that the cognitive function is deteriorated. Alternatively, when some functions of ADAS system (advanced driving assistance system) are activated, a decrease in cognitive function is estimated. For example, when PCS (pre-crash safety) or the improper acceleration suppressing device is activated, a decrease in cognitive function is estimated.

For example, among the driving data acquired from the vehicle 30, items related to the cognitive function are set in advance. The diagnosis unit calculates an evaluation value of cognitive ability based on the data of these items. The display control unit 84 obtains the observation time ΔT2 based on the calculated evaluation value and the cognitive function map. For example, the lower the evaluation value of the cognitive function, the shorter the observation time ΔT2 is set. The observation time ΔT2 is set in a range of, for example, 1 hour or more and 24 hours or less.

Other Embodiments

In the above-described embodiment, a notification message 102 (see FIG. 6) is posted on the chat screen 100 for all driving diagnosis reports. However, the notification message 102 may be selectively generated in order to reduce the burden on the watcher.

For example, an item of interest is set for any item of the driving diagnosis report. For example, an attention item is set by a watcher. Then, only the driving diagnosis report when there is a change in the item of interest is a notification target. The display control unit 84 determines whether or not the notification message 102 can be generated by referring to the driving diagnosis report and the item of interest.

In this case, for example, the notification message 102 may be displayed on the chat screen 100 at the end of the month. The notification message 102 is superimposed with a link button for viewing the driving diagnosis report collectively on a monthly basis.

In the above-described embodiment, as illustrated in FIG. 3, the message application providing unit 80 is provided in the center server 70. Instead of such an in-house installation mode, the message application providing unit 80 may be installed in an external server.

What is claimed is:

1. A driving diagnosis system comprising a processor and a storage medium, wherein:

the processor is configured to execute a program stored in the storage medium to implement an acquisition unit configured to acquire driving data of a watching target person from a vehicle, a diagnosis unit configured to perform driving diagnosis based on the driving data, and a message application providing unit configured to display, on a chat screen, messages input by the watching target person and a watcher;

the message application providing unit includes a display control unit configured to display messages on the chat screen, and a message generation unit configured to generate a reaction message to a result of the driving diagnosis after a notification message for notification that the result of the driving diagnosis has been generated is displayed on the chat screen; and the display control unit is configured to display the reaction message on the chat screen after a predetermined waiting period for waiting for input of a message by the watcher has elapsed from a point in time when the notification message was displayed on the chat screen.

2. The driving diagnosis system according to claim 1, wherein the message generation unit is configured to determine whether the reaction message is generable based on a frequency of input of the message by the watcher.

3. The driving diagnosis system according to claim 1, wherein the message generation unit is configured to transmit a safety check message after a predetermined observation period has elapsed from a point in time when a latest message was input by the watching target person.

4. The driving diagnosis system according to claim 3, wherein:

the result of the driving diagnosis includes an evaluation of a cognitive function of the watching target person; and the predetermined observation period is determined based on the evaluation of the cognitive function.

\*  \*  \*  \*  \*